United States Patent
Komura

[11] Patent Number: 6,160,318
[45] Date of Patent: Dec. 12, 2000

[54] ENERGY SUPPLYING SYSTEM

[75] Inventor: Norio Komura, Saitama, Japan

[73] Assignee: Honda Giken Kogyo Kabushiki Kaisha, Tokyo, Japan

[21] Appl. No.: 09/119,947

[22] Filed: Jul. 23, 1998

[30] Foreign Application Priority Data

Jul. 28, 1997 [JP] Japan ..................... 9-217074

[51] Int. Cl.⁷ .............. F01K 15/00; B60L 1/02; F02C 6/00; F02C 6/18
[52] U.S. Cl. ............... 290/2; 290/1 R; 290/4 R; 290/43; 290/53; 290/54
[58] Field of Search .................. 290/1 R, 4 R, 290/43, 44, 53, 54, 55

[56] References Cited

U.S. PATENT DOCUMENTS

| | | | |
|---|---|---|---|
| 4,103,493 | 8/1978 | Schoenfelder | 60/641 |
| 4,111,259 | 9/1978 | Lebduska | 237/1 A |
| 4,196,590 | 4/1980 | Fries | 60/496 |
| 4,307,575 | 12/1981 | Popinski | 62/148 |
| 4,342,196 | 8/1982 | Yeh | 60/531 |
| 4,363,212 | 12/1982 | Everett | 60/496 |
| 4,462,213 | 7/1984 | Lewis | 60/641.8 |
| 4,498,294 | 2/1985 | Everett | 60/496 |
| 4,538,415 | 9/1985 | Lebecque | 60/639 |
| 4,739,620 | 4/1988 | Pierce | 60/641.8 |
| 4,742,291 | 5/1988 | Bobier et al. | 320/39 |
| 4,841,731 | 6/1989 | Tindell | 60/641.8 |
| 5,498,297 | 3/1996 | O'Neill et al. | |
| 5,512,787 | 4/1996 | Dederick | 290/4 R |
| 5,685,147 | 11/1997 | Brassea | 60/496 |
| 5,896,747 | 4/1999 | Antohi | 62/101 |
| 5,974,804 | 11/1999 | Sterling | 60/670 |

*Primary Examiner*—Elvin Enad
*Attorney, Agent, or Firm*—Armstrong, Westerman, Hattori, McLeland & Naughton

[57] ABSTRACT

Energy supplying system in which effective use of waste heat from a solar power generator and an engine power generator. Electric power generated by an SLCS (sunlight cogeneration system) 1 and an EGCS (engine cogeneration system) 2 is supplied to a power consuming apparatus while its relevant waste or exhausted heat is transferred to a heat consuming apparatus 3. The power generated by the SLCS 1 varies depending on the local climate and is monitored with a power meter 6 or a power monitor apparatus 7. When the power from the SLCS 1 is declined, it is compensated by increasing the power output of the EGCS 2. Since the total power generated by the SLCS 1 and the EGCS 2 is maintained constant and the total waste heat released from the SLCS1 and the EGCS 2 is relatively stable, the heat consuming apparatus 3 as well as an power consuming apparatus 5 are steadily energized.

7 Claims, 4 Drawing Sheets

ENERGY SUPPLYING SYSTEM

BACKGROUND OF THE INVENTION

1. Field of the Invention

The present invention relates to an energy supplying system for use of solar energy and particularly, to an energy supplying system for supplying one or more energy consuming apparatus with energy generated by different types of energy generating facilities.

2. Description of the Related Art

Cogeneration systems are well known in which electric power is generated by an internal combustion engine fueled with fossil fuel and heat generated at the time by the internal combustion engine is transferred to a heat exchanger for potential use as energy.

The use of solar energy also has been focused and, for example, a power supplying system built by a combination of a cogeneration system, a solar generator, and a commercial power source is disclosed in Japanese Patent Laid-open Publication (Hei) 8-186935 in which the power supplying system can supply a desired electric power from the different sources with balance while offsetting the drawback of solar power generation which largely depends on the local climate.

Particularly, in such a solar power generator with a multiplicity of solar cells receiving and converting solar energy into electric power, the solar cells emit a considerable amount of heat which may also be utilized as thermal energy. However, the heat emitted from the solar cells also depends on the local climate similar to the electric power from the cells and will hardly be anticipated for constant and stable emission which may be expected in a generator using fossil fuel.

One of solar cell type cogeneration systems for use of the heat generated due to solar power generation is proposed in Japanese Patent Laid-open Publication (Hei) 5-332636. In the proposed solar cell type cogeneration system, it is intended to use a cooling water heated up by the waste heat from solar cells included therein. Because the cooling water is heated up only to a unsatisfactory temperature and has to be subjected to adiabatic compression to have a desired higher temperature before it is used, the system will be complicated.

SUMMARY OF THE INVENTION

It is an object of the present invention to provide an energy supplying system for use of solar energy which is simplified in the construction and generates a substantially constant quantity of energy regardless of the local climate.

As a first feature of the present invention, an energy supplying system is provided comprising: a solar power generator including generator cells and means for converging the sunlight on the generator cells; first cooling means for cooling the generator cells to recover a first exhausted heat therefrom; a fuel power generator driven by an engine supplied with a fuel; second cooling means for cooling the engine to recover a second exhausted heat therefrom; means adapted to transfer the first and the second exhausted heat thus recovered to a waste heat consuming apparatus; power monitor means for monitoring a total sum of power generated by the solar power generator and the fuel power generator; and a controller for controlling the power generated by the fuel power generator so as to maintain the total sum power equal to a predetermined target value.

According to the first feature, the waste heat exhausted from the solar power generator and the fuel power generator is used as thermal energy for a waste heat consuming apparatus. The operation of the fuel power generator is controlled to maintain the total electric power of the two generators constant and when the power output of the solar power generator is declined due to a change in the local climate, the power output of the fuel power generator is increased for compensation. The higher the power generated by the fuel power generator, the more heat will be received by the cooling water of the engine in the fuel power generator. Consequently, the electric power generated by the system will be constant and stable and the heat supplied to the waste heat consuming apparatus will be uniform.

As a second feature of the present invention, the generator cell or the engine is cooled down with cooling water from the first or the second cooling means and a light converging and heating means and/or an engine exhaust gas heating means is provided for further heating up the cooling water. According to the second feature, the cooling water can be readily heated to a desired higher temperature for use as a thermal energy source.

As a third feature of the present invention, the waste heat consuming apparatus is an absorption type airconditioner in which the cooling water heated is used as thermal energy source for heating and regenerating an absorbent solution in the absorption cycle. As a fourth feature of the present invention, the power generated by the solar power generator and/or the fuel power generator is used as electric energy for driving the waste heat consuming apparatus. According to the third and fourth features, the waste heat consuming apparatus such as the absorption type airconditioner can be supplied with both the electric energy and the thermal energy from a combination of the solar power generator and the engine power generator.

Especially, in a cooling mode of the airconditioner, when the irradiation of sunlight is high and a higher cooling energy is needed, the generator cell receiving a higher irradiation of the sunlight yields a higher level of the thermal energy and feeds it as driving energy to the absorption type airconditioner which can thus perform the cooling operation at a higher efficiency.

A fifth feature of the present invention is implemented by declining the pressure in a regenerator, which regenerates the absorbent solution, to lower the operating temperature. According to the fifth feature, the lowering of the operating temperature allows the regenerator to regenerate the absorbent solution properly using the thermal energy from the cooling water heated in the solar power generator and the engine power generator.

DETAILED DESCRIPTION OF THE PREFERRED EMBODIMENT.

Figure 1:
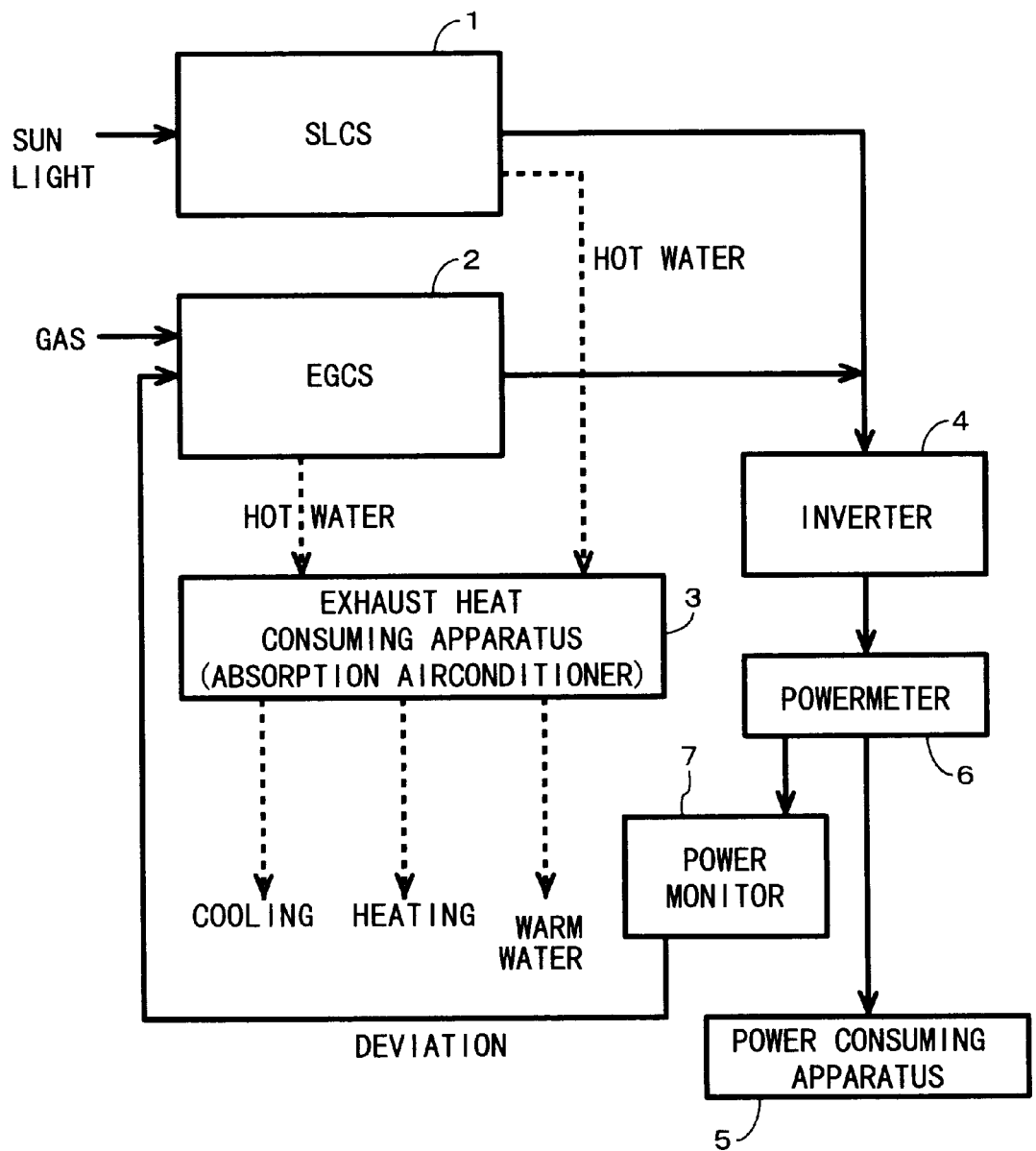
FIG. 1 is a schematic diagram of an energy supplying system according to an embodiment of the present invention.

The present invention will be described in more detail referring to the accompanying drawings. FIG. 1 is a schematic diagram of an energy supplying system according to an embodiment of the present invention. As shown, the energy supplying system includes an SLCS (sunlight cogeneration system) 1 and an EGCS (engine generator cogeneration system) 2. The SLCS 1 and the EGCS 2 will be explained later in more detail. Hot water yielded in the SLCS 1 and the EGCS 2 is transferred to a waste (or exhaust) heat consuming apparatus 3. It is assumed for ease of the description that the waste heat consuming apparatus 3 is an absorption refrigerator or an absorption airconditioner.

After the hot water is declined in temperature by the absorption airconditioner 3, it is circulated back to the SLCS 1 and the EGCS 2. The absorption airconditioner will also be explained later in more detail.

The SLCS 1 and the EGCS 2 generate an electric power which is transmitted to an inverter 4 where it is converted into an alternate current for use in a power consuming apparatus 5 as the waste heat consuming apparatus. The power consuming apparatus 5 may be lights, airconditioners, or household electric appliances. The output of the inverter 4 is connected to a power meter 6. A power monitor apparatus 7 is provided for comparing an output of the power meter 6 with a predetermined target value to produce a deviation. The deviation or output of the power monitor apparatus 7 is connected to a fuel injector (in general, a fuel controller as a throttle valve) which is mounted in the EGCS 2 for controlling a power output of the EGCS 2 and will be explained later in more detail. The power monitor apparatus 7 may be a microcomputer.

Figure 2:
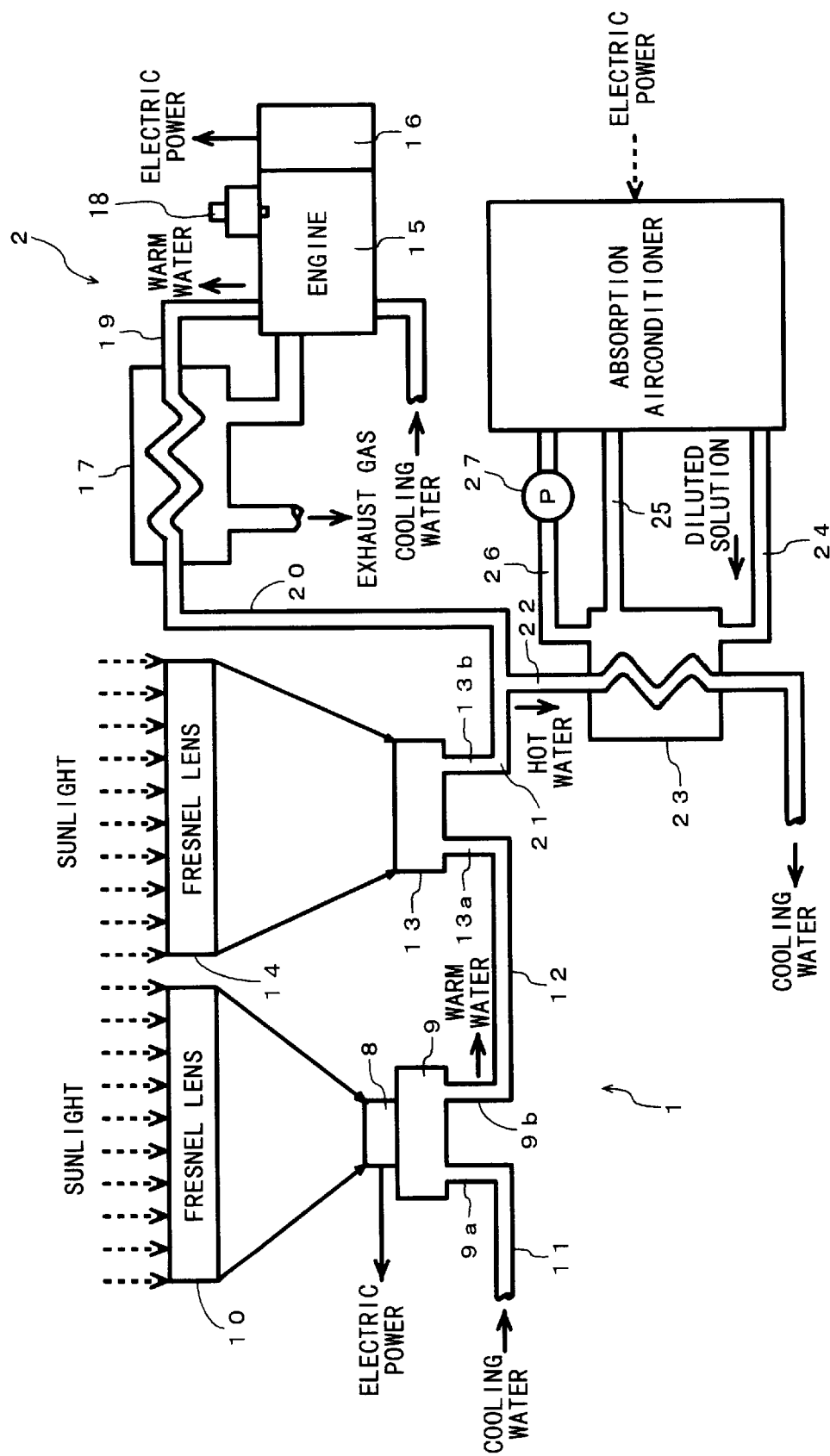
FIG. 2 is a detailed diagram of the energy supplying system according to the embodiment.

The energy supplying system is explained in more detail. FIG. 2 shows a detailed arrangement of the system. As shown, the SLCS 1 is provided with a generator cell 8 mounted on a cooling water conduit 9 through which a cooling water runs. The sunlight is focused by a fresnel lens 10 on the generator cell 8. The fresnel lens 10 may be used to intensify an incident light by 250 times as much, for example, on the generation cell 8. Preferably, the fresnel lens 10 and the generator cell 8 are assembled to a single unit for precisely focusing the sunlight on a desired area on the generator cell 8. A solar generator apparatus in which a fresnel lens 10 and a generator cell 8 are arranged integral with each other is disclosed in U.S. Pat. No. 5,498,297. The present invention may adopt such a solar generator apparatus without its cooling fan.

In operation, the generator cell 8 is heated by the focused sunlight and has to be cooled down with the cooling water which runs through the cooling water conduit 9. The cooling water is introduced from a tube 11 and fed into the cooling water conduit 9 at an inlet 9*a*. The cooling water absorbs heat generated in the generator cell 8 to be warm water which is then discharged from an outlet 9*b* of the cooling water conduit 9. The warm water discharged from the outlet 9*b* is transferred via a tube 12 to a heater section where it is further heated up. The heater section comprises a heater cell or a second cooling water conduit 13 and a fresnel lens 14 for focusing the sunlight on the second cooling water conduit 13. The fresnel lens 14 to intensify an incident light by 250 times as much, for example, on the generation cell 8. The warm water fed from an inlet 13*a* of the second cooling water conduit 13 is further heated up to a higher temperature to be hot water, and then discharged from an outlet 13*b*.

The EGCS 2 comprises an engine 15, a generator 16 driven by the engine 15, and a muffler 17 joined to the engine 15. The engine 15 is equipped with a fuel injector 18 for injecting fuel into the engine 15 and a valve controller (not shown) for determining a valve opening duty of the fuel injector 18. The engine 15 is not limited to a particular type but may preferably be fueled with gas fuel such as LPG or LNG. The engine 15 may be of a carburetor type other than the fuel injection type.

The engine 15 is covered with a water jacket (not shown) for cooling. The cooling water is introduced into the water jacket and, after absorbing heat from the engine, discharged as a warm water. Exhaust gas from the engine 15 is released through the muffler 17 to the outside. The warm water in the water jacket of the engine 15 is transferred through a tube 19 to the muffler 17. The warm water is further heated up by the exhaust gas in the muffler 17 and turned to a hot water. The hot water is discharged from the muffler 17 to a tube 20 and mixed with the hot water conveyed through a tube 21 from the second cooling water conduit 13.

The hot water transferred through the tubes 20 and 21 is released to a confluence tube 22 and conveyed to a regenerator 23 for regenerating a refrigerant for the absorption airconditioner 3. In the absorption airconditioner 3, as well known, the refrigerant is declined in temperature as it releases a refrigerant vapor, while an absorbent solution is increased in temperature as it absorbs the refrigerant vapor. The absorbent solution and the refrigerant are subjected to heat exchange with the cooling water, respectively, for generating desired temperature levels of chilled and/or heated air.

The absorbent solution, when having absorbed the refrigerant vapor, is declined in the concentration of absorbent and thus lowering the capability of refrigerant vapor absorption. For separating the refrigerant from the absorbent solution to recover the absorbent concentration in the absorbent solution, the regenerator 23 is provided in the system. A diluted absorbent solution is fed through a tube 24 into the regenerator 23 where it is heated up by the hot water running in the tube 22 thus releasing the refrigerant vapor. The absorbent solution after having been separated from the refrigerant and recovered in the absorbent concentration and the released refrigerant are conveyed via tubes 25 and 26, respectively, to the absorption airconditioner 3 for another absorption cycle. If the heating up in the regenerator 23 using the hot water from the SLCS 1 and the EGCS 2 fails to provide a desired level of heat, a burner (not shown) may be used. Alternatively, an electric heater may be provided to be energized by the electric power generated by the SLCS 1 and/or the EGCS 2.

A condenser, not shown, is provided in a midway of the tube 26 for condensing the refrigerant vapor released from the absorbent solution by the heating up in the regenerator 23. For lowering the operating pressure in the regenerator 23, a compressor 27 may be provided in the tube 26 connecting the condenser and the regenerator 23. Assuming that the absorbent solution contains DMI derivative (dimethyl imidazolidinon) and the refrigerant is TFE (trifluoroethanol), the operating temperature in the regenerator 23 is desirably 135 C. When the temperature of the hot water introduced into the regenerator 23 is lower than that degree, the refrigerant is hardly vapored. For a countermeasure therefore, the compressor 27 is actuated to lower the operating pressure in the regenerator 23 and thus lower the vaporing temperature of the refrigerant. The compressor 27 may be responsive to the temperature of the hot water introduced into the regenerator 23, or more particularly, may be energized only when the temperature of the hot water is lower than 135° C. The power generated by the SLCS 1 and/or the EGCS 2 may be consumed by electric lights and other appliances as well as the absorption airconditioner 3 and the electric heater in the system.

Figure 3:
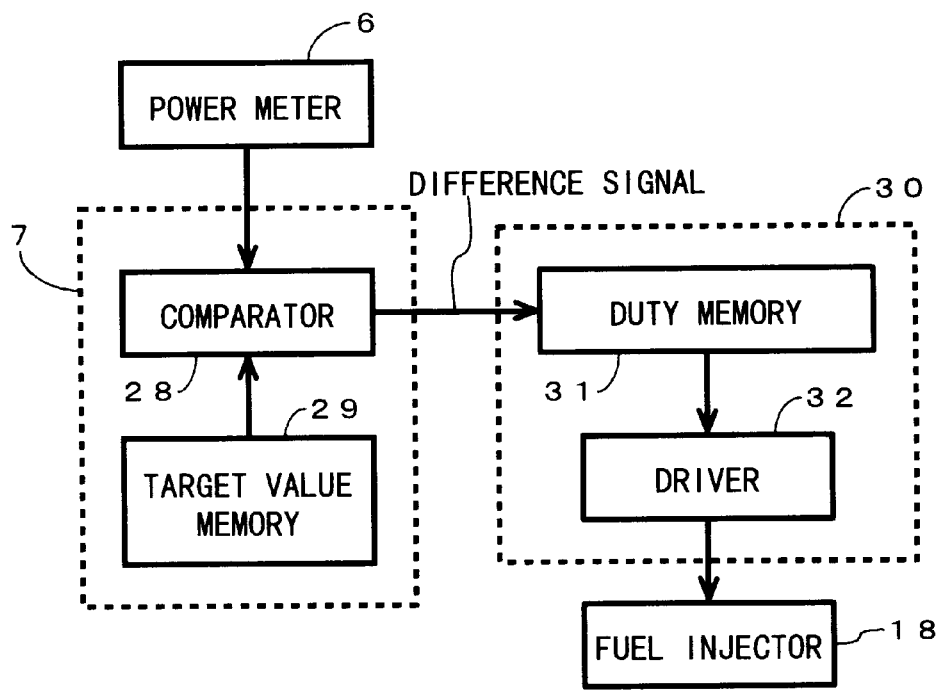
FIG. 3 is a functional block diagram of a controller for stabilizing a power.

The power monitor apparatus 7 is now described together with the valve opening controller. FIG. 3 is a block diagram showing a combination of the power monitor apparatus 7 and the valve opening controller 30. The AC power generated by the inverter 4 is measured by the power meter 6. A resultant measurement of the power meter 6 is transmitted to a comparator 28 in the power monitor apparatus 7. The comparator 28 compares the measurement with a target value prestored in a target value memory 29 and produces a difference signal indicative of a deviation from the target. The difference signal is then sent to a duty memory 31 in the valve opening controller 30. The duty memory 31 holds a set of target duty values corresponding to the sign and the magnitude of the deviation and releases a lower duty value when the deviation is positive to indicate that the power generated is greater than the target value, while it releases a higher duty value when the deviation is negative indicating that the power generated is smaller than the target value.

The duty value is then delivered to a driver 32 which in turn energizes a valve opening electromagnetic coil (not shown) of the fuel injector 18 according to the duty value supplied thereto. More specifically, when the high duty value is received, the fuel injector 18 delivers a large amount of fuel, while when the low duty value is received, the fuel injector 18 delivers a small amount of fuel. Although the control over the valve opening duration of the fuel injector is described herein, the throttle valve in the EGCS 2 may be controlled to adjust the output power thereof in a similar manner.

When the sum power generated by the SLCS 1 and the EGCS 2 is smaller than its target value, it is complemented by increasing the RPM of the engine 15 and the output power of the EGCS 2. When the sum power is greater than the target value, it is reduced by decreasing the RPM of the engine 15 and the output power of the EGCS 2. Accordingly, if the power generated by the SLCS 1 is varied depending on unstable conditions of the climate, the total power generated by the energy supplying system remains constant. Simultaneously, the thermal energy exhausted from the SLCS 1 and the EGCS 2 will be maintained relatively constant.

Although the sum power generated by both the SLCS 1 and the EGCS 2 is monitored to be stabilized in the system of the above-mentioned embodiment, a modification may be provided in which only the power generated by the SLCS 1 is monitored by a similar means and its deviation is offset by controlling the output of the EGCS 2.

Figure 4:
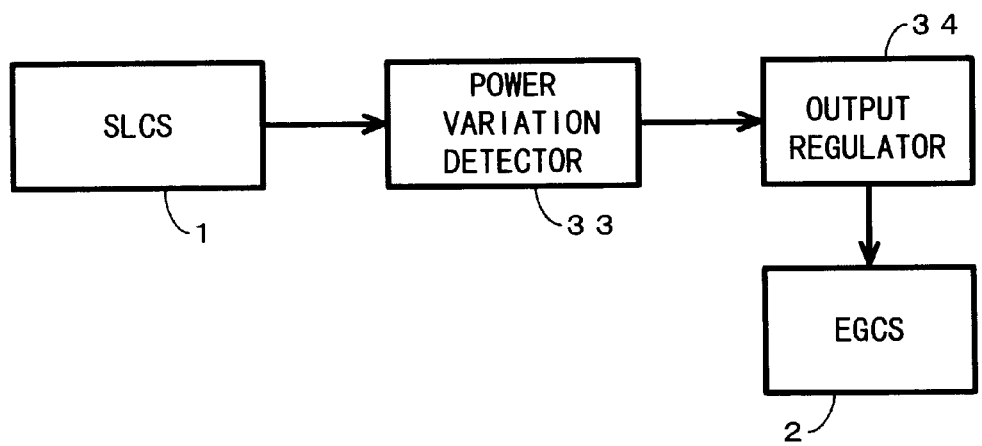
FIG. 4 is a functional block diagram showing a primary part of a modification of the embodiment.

FIG. 4 is a block diagram of such a modification in which the deviation (a positive or negative value) per unit time from the target power output of the SLCS 1 is detected by a power variation detector 33. Also provided is an output regulator 34 which holds output regulation values corresponding to different levels of the deviation and controls the output of the EGCS 2 in response to the deviation determined by the power variation detector 33. The control over the output power may be conducted by changing the valve opening duration of a fuel injector as mentioned above.

The modification in FIG. 4 may further be modified.

Figure 5:
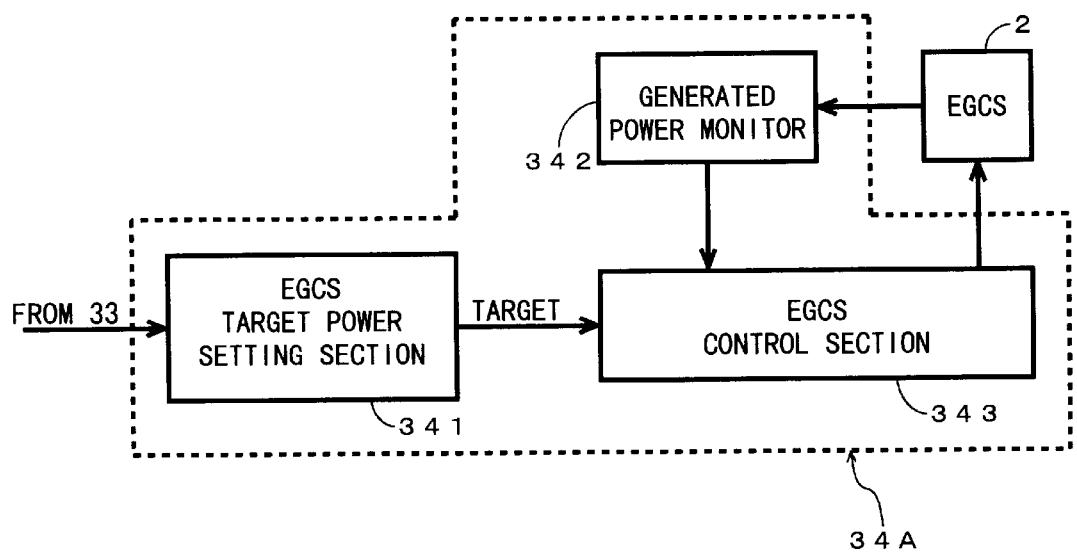
FIG. 5 is a functional block diagram showing a primary part of another modification of the embodiment.

More particularly, the output regulator 34 is modified, as shown in FIG. 5, for controlling so that the power generated by the EGCS 2 corresponds to its target value which is updated by a deviation output of the power variation detector 33. In a modified output regulator 34, a target power setting section 341 determines a target power which is expected to be generated by the EGCS 2 to compensate the variation in the power generated By the SLCS 1. A generated power monitor 342 detects the power generated by the EGCS 2 to supply a EGCS control section 343 which issues a control (regulation) signal to the EGCS 2 so that the power generated by the EGCS 2 approaches the target power. The control signal is a function of a deviation of the power generated by the EGCS 2 from the target power. Accordingly, the output of the EGCS 2 can be regulated by the output regulator 34 for compensating a variation in the power output of the SLCS 1.

As set forth above, the present invention offers the stabilization of the total power produced by the solar power generator and the fuel power generator and also of the thermal energy yielded from the cooling water which run through the solar power generator and the fuel power generator or engine, hence supplying a constant, stable level of energy to an energy consuming apparatus such as a waste heat consuming apparatus and an electric power consuming apparatus.

What is claimed is:

1. An energy supplying system comprising:
   a solar power generator including generator cells and means for converging the sunlight on the generator cells;
   first cooling means for cooling the generator cells to recover a first exhausted heat therefrom; a fuel power generator driven by an engine supplied with a fuel;
   second cooling means for cooling the engine to recover a second exhausted heat therefrom;
   means for transferring the first and the second exhausted heat thus recovered to an absorption type air conditioner in which the cooling water is forced to run through a regenerator for heating up and regenerating an absorbent solution;
   power monitor means for monitoring a total sum of power generated by the solar power generator and the fuel power generator; and
   a controller for controlling the power generated by the fuel power generator so as to maintain the total sum power equal to a predetermined target value so that a variation in the power output of the solar power generator is substantially offset.

2. An energy supplying system according to claim 1, wherein the first cooling means using a cooling water for cooling the generator cells, further comprising a light converging and heating means for converging the sunlight and for heating the exhausted water supplied from the first cooling means with the converged sunlight;
   the second cooling means using a cooling water for cooling the engine; and
   the means transferring the exhausted heat recovered being a conduit for conveying the cooling water discharged from the light converging and heating means and the second cooling means to the heat consuming apparatus.

3. An energy supplying system according to claim 2, wherein the cooling water discharged from the second cooling means is further heated with exhaust gas from the engine before being transferred to the conduit.

4. An energy supplying system according to claim 1, wherein the power generated by at least one of the solar power generator and the fuel power generator is used as an electric power for the operation of the waste heat consuming apparatus.

5. An energy supplying system according to claim 1, further comprising a compressor for declining the pressure in the regenerator to lower the operating temperature of the regenerator.

6. An energy supplying system comprising:
   a solar power generator including generator cells and means for converging the sunlight on the generator cells;

first cooling means for cooling the generator cells to recover a first exhausted heat therefrom;

a fuel power generator driven by an engine supplied iwth a fuel;

second cooling means for cooling the engine to recover a second exhausted heat therefrom;

means for transferring the first and the second exhausted heat thus recovered to a waste heat consuming appartus;

solar power monitor means for monitoring a varation in the power output of the solar power generator;

a controller for controlling the fuel power generator to var its power output so that the varation in the power output of the solar power generator is substantially offset;

fuel power generator monitoring means for monitoring the power output of the fuel power generator and wherein the controller is arranged so that the operation of the fuel power generator is controlled to maintain its power output equal to a predetermined target value and includes a target value setting means for modifying the target value by an amount which is substantially equal to the variation in the power output of the solar power generator.

7. An energy supplying system according to claim 6, further comprising a compressor for declining the pressure in the regenerator to lower the operating temperature of the regenerator.

* * * * *